United States Patent
Shacham et al.

(10) Patent No.: US 10,255,586 B2
(45) Date of Patent: Apr. 9, 2019

(54) DERIVING MULTI-LEVEL SENIORITY OF SOCIAL NETWORK MEMBERS

(71) Applicant: Microsoft Technology Licensing, LLC, Redmond, WA (US)

(72) Inventors: Dan Shacham, Sunnyvale, CA (US); Uri Merhav, Rehovot (IL); Peide Zhong, Milpitas, CA (US); Qi He, San Jose, CA (US); Angela Jiang, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 334 days.

(21) Appl. No.: 15/199,423

(22) Filed: Jun. 30, 2016

(65) Prior Publication Data
US 2018/0005192 A1    Jan. 4, 2018

(51) Int. Cl.
| | | |
|---|---|---|
| *G06Q 10/00* | (2012.01) | |
| *G06Q 10/10* | (2012.01) | |
| *G06Q 50/00* | (2012.01) | |
| *G06F 16/9535* | (2019.01) | |
| *G06F 16/2457* | (2019.01) | |

(52) U.S. Cl.
CPC ... *G06Q 10/1053* (2013.01); *G06F 16/24578* (2019.01); *G06F 16/9535* (2019.01); *G06Q 10/105* (2013.01); *G06Q 50/01* (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0042483 | A1* | 3/2006 | Work | G06Q 10/00 101/91 |
| 2006/0064486 | A1* | 3/2006 | Baron | H04L 41/0886 709/224 |
| 2012/0330855 | A1* | 12/2012 | Maxwell | G06Q 10/00 705/320 |
| 2014/0025686 | A1* | 1/2014 | Wong | G06Q 10/10 707/748 |

(Continued)

OTHER PUBLICATIONS

What social networks reveal about behavior. Evangelista, Benny. San Francisco Chronicle May 12, 2010: D1.*

(Continued)

*Primary Examiner* — Gabrielle A McCormick
(74) *Attorney, Agent, or Firm* — Schwegman Lundberg & Woessner, P.A.

(57) ABSTRACT

An online social networking system receives an unstructured job title record from a profile of a member or a job posting. The system extracts a raw job title from the unstructured job title record, and extracts a first seniority level from the raw job title. The first seniority level is a seniority modifier associated with the raw job title. The system determines a second seniority level. The second seniority level is a company seniority within the company associated with the unstructured job title record. The system determines a third seniority level. The third seniority level is a seniority score for the member or the job posting. The system compares the seniority score with a second seniority score, and communicates with the member, or transmits the job posting to the member, based on the comparison of the seniority score and the second seniority score.

18 Claims, 6 Drawing Sheets

(56) References Cited

U.S. PATENT DOCUMENTS

| | | | | |
|---|---|---|---|---|
| 2014/0143164 A1* | 5/2014 | Posse | ............... | G06Q 10/105 |
| | | | | 705/319 |
| 2014/0244759 A1* | 8/2014 | Smith | ............... | H04L 67/22 |
| | | | | 709/204 |
| 2014/0324721 A1* | 10/2014 | Rennison | ............... | G06Q 50/2057 |
| | | | | 705/321 |
| 2015/0032747 A1* | 1/2015 | Giverts | ............... | G06F 17/2715 |
| | | | | 707/737 |
| 2015/0161567 A1* | 6/2015 | Mondal | ............... | G06Q 10/1053 |
| | | | | 705/321 |

OTHER PUBLICATIONS

Viralheat Upgrades Social Media Management Suite Wireless News: NA. Close-Up Media, Inc. (Oct. 16, 2013).*

\* cited by examiner

DERIVING MULTI-LEVEL SENIORITY OF SOCIAL NETWORK MEMBERS

TECHNICAL FIELD

The present disclosure generally relates to the technical field of online social networking services, and in an embodiment, but not by way of limitation, to deriving a multi-level seniority of a social network member or a position in a job posting on an online social network.

BACKGROUND

Online social networks provide its members the ability to connect and communicate with other members. Online social networks include a personal profile for each member, which includes the educational history, work history, and personal interests of the member. Many online social networks also include a job posting functionality, wherein employers can post available jobs and potential employees can search through the posted job openings. As with job advertisements prior to the creation of online social networks, such posted available jobs include information such as the employer name, the job title, required work experience, required educational level, and starting salary.

DESCRIPTION OF THE DRAWINGS

Some embodiments are illustrated by way of example and not limitation in the accompanying drawings, in which.

DETAILED DESCRIPTION

In the following description, for purposes of explanation, numerous specific details are set forth in order to provide a thorough understanding of the various aspects of different embodiments of the present invention. It will be evident, however, to one skilled in the art that the present invention may be practiced without all of the specific details and/or with variations, permutations, and combinations of the various features and elements described herein.

The present disclosure describes methods, systems, and computer program products for determining a multi-level seniority of a member of an online social network or a position in a job posting on the online social network. More specifically, the methods, systems, and computer program products receive an unstructured job title record from a profile of a member of, or a job posting on, the online social network system. The online social network system extracts a raw job title from the unstructured job title record. For example, the raw job title could be "software engineer." The raw job title includes one or more job positions or roles. A job position or role includes a responsibility of a person in a company. The company is associated with the unstructured job title record. The online social networking system extracts a first seniority level from the raw job title. The first seniority level includes a seniority modifier that is associated with the raw job title. For example, a seniority modifier of a "software engineer" could be "senior." The online social networking system then determines a second seniority level. The second seniority level includes a company seniority within the company associated with the unstructured job title record. Thereafter, the online social networking system determines a third seniority level. The third seniority level includes a seniority score that is calculated for the member or the job posting. The online social networking system compares the seniority score of the member or job posting with a second seniority score that is associated with a second member or a second job posting. The second member and the second job posting are associated with a second company. Lastly, in an embodiment, the online social networking system communicates with the member or the second member, or transmits the job posting to the member or second member, based on the comparison of the seniority score of the member or job posting and the second seniority score associated with the second member or the second job posting.

Figure 1:
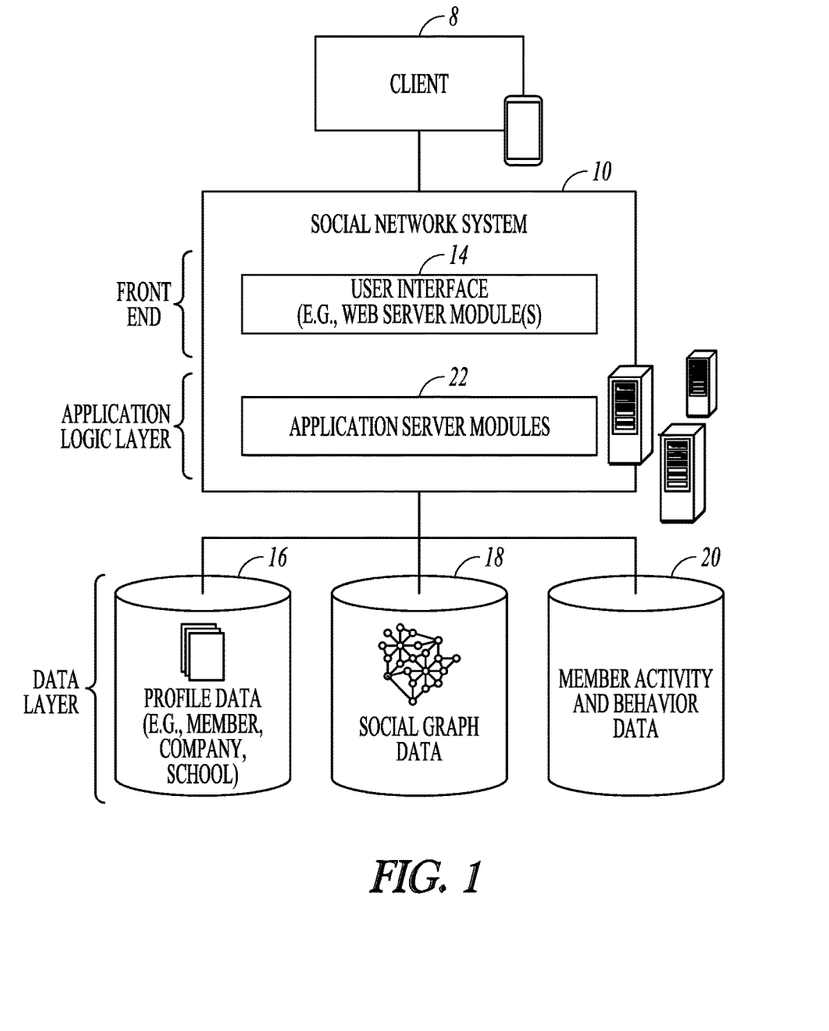
FIG. 1 is a block diagram of the functional modules or components that comprise a computer network-based online social networking system, including application server modules consistent with some embodiments of the invention.

FIG. 1 is a block diagram of the functional modules or components that comprise a computer-based or network-based online social networking service 10 consistent with some embodiments of the invention. As shown in FIG. 1, the online social networking service 10 is generally based on a three-tiered architecture, comprising a front-end layer, application logic layer, and data layer, and can communicate with a client device 8. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the present subject matter with unnecessary details, various functional modules and engines that are not germane to conveying an understanding of the present subject matter have been omitted from FIG. 1. However, a skilled artisan will readily recognize that various additional functional modules and engines may be used with an online social networking service, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the present subject matter is by no means limited to such architecture.

As shown in FIG. 1, the front end comprises a user interface module (e.g., a web server) 14, which receives requests from various client-computing devices, and communicates appropriate responses to the requesting client devices. For example, the user interface module(s) 14 may receive requests in the form of Hypertext Transport Protocol (HTTP) requests, or other web-based, application programming interface (API) requests. The client devices may be executing conventional web browser applications, or applications that have been developed for a specific platform to include any of a wide variety of mobile devices and operating systems.

As shown in FIG. 1, the data layer includes several databases, including one or more databases 16 for storing data relating to various entities represented in a social graph. With some embodiments, these entities include members, companies, and/or educational institutions, among possible others. Consistent with some embodiments, when a person initially registers to become a member of the online social networking service, and at various times subsequent to initially registering, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored as part of a member's profile, for example, in the database with reference number 16. With some embodiments, a member's profile data will include not only the explicitly provided data, but also any number of derived or computed member profile attributes and/or characteristics.

Once registered, a member may invite other members, or be invited by other members, to connect via the online social networking service. A "connection" may require a bi-lateral agreement by the members, such that both members acknowledge the establishment of the connection. The degree of connectivity refers to the amount or number of connections that exist for a particular person and/or the amount or number of connections among a group of persons. Similarly, with some embodiments, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, a topic, a conversation, or some other entity. In general, the associations and relationships that a member has with other members and other entities (e.g., companies, schools, etc.) become part of the social graph data maintained in a database 18. With some embodiments a social graph data structure may be implemented with a graph database 18, which is a particular type of database that uses graph structures with nodes, edges, and properties to represent and store data. In this case, the social graph data stored in database 18 reflects the various entities that are part of the social graph, as well as how those entities are related with one another.

With various alternative embodiments, any number of other entities might be included in the social graph, and as such, various other databases may be used to store data corresponding with other entities. For example, although not shown in FIG. 1, consistent with some embodiments, the system may include additional databases for storing information relating to a wide variety of entities, such as information concerning various online or offline groups, job listings or postings, photographs, audio or video files, and so forth.

With some embodiments, the online social networking service may include one or more activity and/or event tracking modules, which generally detect various user-related activities and/or events, and then store information relating to those activities/events in the database with reference number 20. For example, the tracking modules may identify when a user makes a change to some attribute of his or her member profile, or adds a new attribute. Additionally, a tracking module may detect the interactions that a member has with different types of content. Such information may be used, for example, by one or more recommendation engines to tailor the content presented to a particular member, and generally to tailor the user experience for a particular member.

The application logic layer includes various application server modules 22, which, in conjunction with the user interface module(s) 14, generate various user interfaces (e.g., web pages) with data retrieved from various data sources in the data layer. With some embodiments, individual application server modules 22 are used to implement the functionality associated with various applications, services and features of the online social networking service. For instance, a messaging application, such as an email application, an instant messaging application, or some hybrid or variation of the two, may be implemented with one or more application server modules 22. Of course, other applications or services may be separately embodied in their own application server modules 22.

The online social networking service may provide a broad range of applications and services that allow members the opportunity to share and receive information, often customized to the interests of the member. For example, with some embodiments, the online social networking service may include a photo sharing application that allows members to upload and share photos with other members. As such, at least with some embodiments, a photograph may be a property or entity included within a social graph. With some embodiments, members of an online social networking service may be able to self-organize into groups, or interest groups, organized around a subject matter or topic of interest. Accordingly, the data for a group may be stored in a database. When a member joins a group, his or her membership in the group will be reflected in the social graph data stored in the database with reference number 18. With some embodiments, members may subscribe to or join groups affiliated with one or more companies. For instance, with some embodiments, members of the online social networking service may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modeled with the social graph data of the database with reference number 18.

Figure 2:
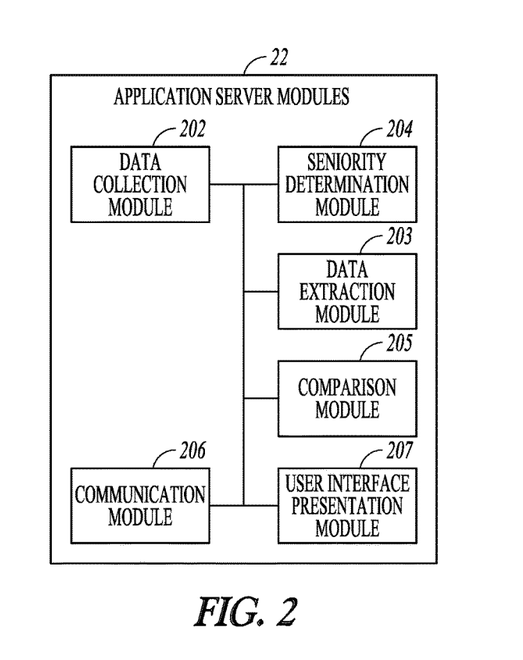
FIG. 2 is a block diagram depicting some example application server modules of FIG. 1.

FIG. 2 is a block diagram depicting some example: application server modules 22 of FIG. 1. A data collection module 202. may be configured to collect, for example, unstructured job title records from the profile of a member of an online social network system or from a job posting on the online social networking system. Other data that can be collected by the data collection module 202 include other profile data, behavior data, endorsement data, online social networking service data, occupation data, and connectivity data. A data extraction module 203 extracts a raw job title from the unstructured job title record. The data extraction module 203 also extracts a first level seniority modifier from the raw job title record. A seniority determination module

204 determines both a second seniority level, which is a seniority level in the company associated with the member or the job posting, and a third seniority level, which consists of a seniority score for the particular member or the particular job posting. A comparison module 205 compares seniority scores between different members, between different job postings, and/or between a particular member and a particular job posting. A communication module 206 transmits communications to the member or members, the communications relating to other members or job postings. In particular, the communication module 206 can transmit a job posting to a member because, among other things, the member's seniority score and the seniority score for a particular job posting are very similar. A user interface presentation module 207 generates a user interface for presentation to the user. The user interface may include information pertaining to other members and/or job postings, which can be determined in part the third level seniority of the other members and job postings.

In an online social networking system as depicted in FIGS. 1 and 2, comprehensive and accurate job title data is one of the pillars of an economic graph, and can be important to an online social network system achieving a goal of creating economic opportunity for every member of the global workforce. An economic graph is a feature of an online social network system that digitally maps the global economy to connect, talent with opportunity on a massive scale. An online social network system's ability to map both members and jobs to titles at scale can drive unique targeting and search capabilities, thereby allowing marketers, sales professionals, and recruiters to find their target audience by title, seniority and other dimensions as well. By creating rich, accurate and comprehensive mapping of members and jobs to tides, the online social networking system can create an ultimate data source for titles information and ensure that its products provide the best in class title data-based targeting capabilities.

In short, in an embodiment, a goal is to identify the correct title identifications given a raw member title on a member profile position or given a raw title on a job posting, and then determine different levels of seniority for that title. A member profile position can be stored in an online social networking system under an "Experience" record or object on a member profile of the online social networking system. The overall idea of mapping members to titles, and in particular multi-dimensional titles, is based on an accepted definition of a title, that is, the least granular standardized representation that best captures the meaning of the original or raw member position or a job title. Based on the above definition of the problem, mapping both members and jobs to a multi-dimensional title means finding all the title entities in a title taxonomy that were mentioned in the raw title of the member profile or job posting. For example, if the raw title was "sr. swe," a standardized. title could be "senior software engineer."

A title the taxonomy is defined as a monolithic unit (that is, not multi-dimensional) that describes one's profession. In prior online social networking systems, a titles taxonomy attempted to capture all the possible professions in the world, based on its member's data. Some taxonomy entity examples include system analyst, senior system analyst, team lead, art director, asset protection specialist, and senior financial analyst.

Also in prior title taxonomies in online social network systems, there is a problem with synonyms. For example, the taxonomy can contain both "software developer" and "software engineer," each having a different identification (such as a numeric identifier that is used for many purposes in the online social networking system), even though both of these titles have the same responsibilities in a company and mean the same thing. Also, in an online social networking system, because members input their own titles and employers create their own job postings, a title taxonomy may have entries in it that are not titles that describe job responsibilities, such as "full time." Additionally, many entries are skills or non-informative titles such as "consultant." There may also be inconsistency among different titles in a taxonomy, such as there may be "senior software engineer," "software engineer," and "data scientist" in the taxonomy, but not "senior data scientist."

Because prior taxonomies in an online social networking system capture a monolithic view of a job position, only an exhaustive representation of every possible position in the world would result in being able to identify the essence of each and every raw title, without losing information. As such a task is not possible, whenever the raw title is not part of the taxonomy on an online social networking system, a not insubstantial amount of information is lost. For example, the taxonomy in the online social networking system may have "java software engineer", but it probably won't have "scala software engineer." Thus, when mapping the raw title of "scala software engineer," the "scala" descriptor would be lost. As another example, the taxonomy may have "machine learning engineer," but it probably won't have "freelance machine learning engineer." Thus, when mapping this raw title, the "freelance" modifier would be lost. As another example, the taxonomy may have "machine learning engineer," but it probably won't have "machine learning professor." Thus, when mapping this raw title, the specialty of "professor" would be lost.

Also, an online social network service may consist of many departments, and some departments may be clients of other departments. For some clients, the seniority part of a job title may not matter. For other clients, the specific skills may not matter. For others, the employment relationship may not matter. Thus, when all the semantic information lies in one taxonomy and cannot be exposed and extracted, the different clients don't have the ability to choose how they use these data. Such clients should have better control over their input.

In an embodiment, a raw title refers to a string representing one or more positions. A position refers to a representation of one responsibility of a person in a company. A title is an internal representation of a position in a taxonomy. A seniority modifier modifies the title, and helps identify different degrees of experience for different persons who have the same job title.

It is possible that a raw title would describe several positions, such as "director of marketing and sales." In this example, the raw title describes two different responsibilities, and thus, two different positions—"director of marketing" and "director of sales." In this case, when a raw title is used to read a standardized taxonomy, two different titles should be returned, each representing a different position. When there is more than one position in a raw title, it can be assumed the titles are equivalent in the sense that this person holds both positions within the company. This does not mean however that two standardized titles would have the same score (relating to confidence in the retrieved standardized title), but rather it means that one cannot be preferred one over the other. Using a confidence score would allow clients to select which of the standardized titles they want to use.

Figure 3:
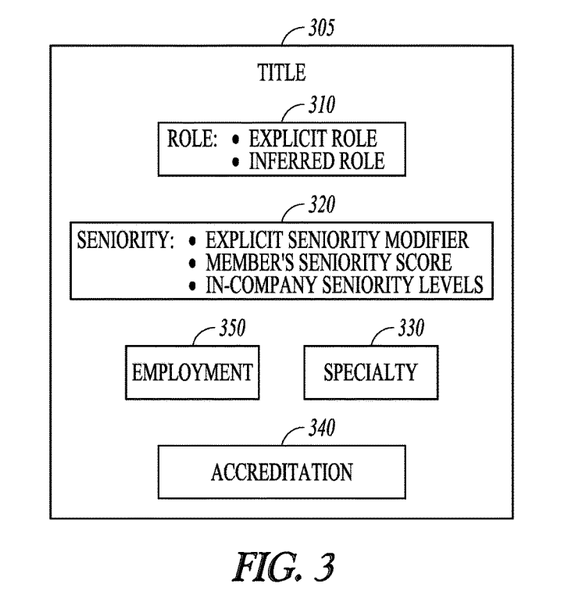
FIG. 3 illustrates an example description of an output from a job role standardization module.

Given the above problems, a different definition for the job title than that which has been used in prior online social networking systems is selected. This job title definition is graphically illustrated in FIG. 3. Specifically, a title 305 represents all the aspects needed in order to understand what a person is doing in a particular job position given the member's information, or what a person should do, given a job posting. These semantic aspects contain the following. A role 310, which is the essence of what a person is doing. It also often reveals information about the member's seniority or domain knowledge, for example, "software engineer," "VP of finance," or "registered nurse." The seniority 320 is the level of responsibility of a person, and as noted serves to permit one to differentiate two or more persons who may have the same job title. The specialty 330 includes information about an explicit skill or domain information that was not captured in the role 310, such as "java software engineer" or "cardiovascular surgeon." The accreditation 340 is the type of accreditation for this position, such as "registered" or "certified." The employment status 350 is the employment relationship between the position and the company, such as full time or contractor. The role 310 is the core of the title and all the other dimensions add information in order to better understand the position. In an embodiment, each dimension has its own taxonomy and the combination of all the different dimensions provides the complete understanding of what this position is all about. As per the above definition, the title is not a monolithic entity, but rather a composition of several dimensions that describes one position.

Figure 3A:
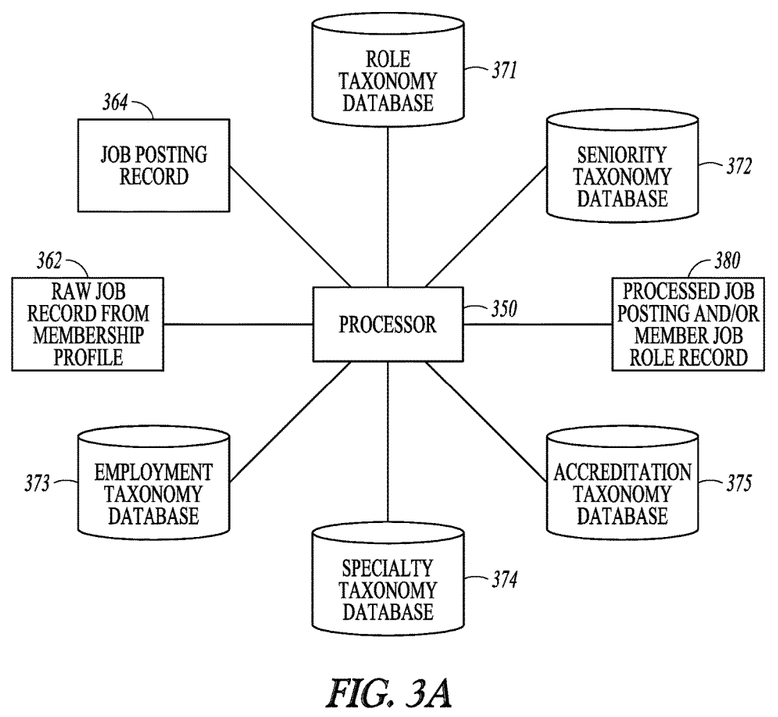
FIG. 3A is a block diagram of a system that derives multiple seniority levels in an online social networking system.

FIG. 3A is a block diagram of a system that derives multiple seniority levels in an online social networking system. A processor 350 reads in an unstructured raw job record from either a member profile 362 or a job posting record 364. The processor processes the raw job record, and uses one or more of the role taxonomy database 371, the seniority taxonomy database 372, the employment taxonomy database 373, the specialty taxonomy database 374, and the accreditation taxonomy database 375 to extract or create at 380 different dimensions for the job title or role.

A title's dimensions are an internal representation of the different aspects of the title mentioned above in connection with FIG. 3. These dimensions may hold more information about these aspects, such as "inferred" versus "explicit." Some of these dimensions are mandatory (such as role and title seniority) and the others are optional and describe aspects that were not explicitly mentioned in the role. Since a multi-dimensional taxonomy is manually created and holds an important domain knowledge and business decisions, an online social networking system should always try to respect the taxonomy and not alter it. This means that if a title is found in the roles taxonomy, the online social networking system should not try to break it into different dimensions, as an assumption can be made that all the relevant information already exists in the role and that it is important enough to be a role by itself. If it wasn't, it should not have been added to the taxonomy in the first place. The logic behind this is that the main dimension uses it to compare two different positions in the role. If a specific role is part of the taxonomy, it means it has a different semantics or an important business logic, different than any other entity in the taxonomy. For example, if the raw title is "registered nurse" and "registered nurse" is a role in the taxonomy, the accreditation part in the taxonomy will be null, as it does not add any information to the role. If the role is "certified software engineer", and "certified software engineer" is not an entire title as a role in the roles taxonomy, then "certified" is an additional piece of information and would be returned in the accreditation field.

The job role is the core part of the title and it represents a concrete semantic meaning. The role defines the essence of the job and can be used in the phrase "I work as a . . . " However, sometimes the role is not enough to fully understand what the person is doing, as the role may be too vague. The role is a descriptor for a person rather than a skill or domain (e.g., software engineer, not software engineering; salesperson, not sales). Combined with the other dimensions, the role's meaning can be enriched and there can be a concrete understanding of the position.

One should be able to determine, for each role, how vague it is. Thus, if the raw title is "manager", it would be standardized or taxonomized to "manager," and it would be noted that this is highly vague. The title classifier attempts to further disambiguate such roles, and infers an implicit, non-vague role, based on a member's or a job's context. The vagueness of a role can be defined using the entropy of the distribution of more granular titles under it. The number of other title identifications are sub-identifications of this identification. In an embodiment, the vagueness of a role can be marked as binary, that is, 1 if it is vague and 0 if not vague. In another embodiment, vagueness can be automatically inferred via an analysis (regression analysis for example) of members, skills, industries, and descriptions that are associated with the job title.

In an embodiment, whenever the role is not a leaf in the job role taxonomy, an attempt is made to better infer a more specific role. For example, if the raw title is "engineer," the explicit role would be "engineer" and the inferred role (based on any available context information such as proficiency in software languages) may be "software engineer." If the raw title was "software engineer," the role would be "software engineer" and the inferred role would be null.

Seniority data contains both explicit data that can be extracted directly from the, job title and a list of inferred fields that require some external information. For an explicit seniority there is a seniority modifier present in the job title. That is, an identification that is directly determined from the seniority modifiers in the title. This value is a modifier over the level of seniority of the role, and it is used to understand the distance from this person's position to the average person with the base job role. This is a normalization of all the different modifiers, that is, a mapping from a modifier string to a seniority modifier taxonomy. For example, both "senior," "sr.," and "lead" may have the same identification and "partner" and "associate" may have another identification. The seniority modifier is only an additional piece of information to the role and it exists only when it changes the seniority level of the role itself. Having such a modifier enables one to break down the title seniority and to determine how much time it takes to attain the seniority token "senior" as a software engineer, and what fraction of seniors make it to staff in the tech industry. For example, if the job title is "Senior Data Scientist," the role would be "Data Scientist" and the seniority modifier would be "senior." If the job title is "Data Scientist," then the role is "Data Scientist" and the seniority modifier would be null. If the job title is "Senior VP of finance," the role is "VP of finance" and the seniority modifier is "senior." If the job title is "VP of finance," then the role is "VP of finance" and the seniority modifier is null.

In an embodiment, the seniority can be inferred. For example, if a raw job title includes "software engineer," but there is no seniority modifier associated with this role, a seniority modifier could be inferred from the number of years that a person has been a software engineer (as determined from the person's profile), or the number of years of experience required by a job posting.

In-company seniority levels are a set of categories that defines the level of responsibilities of a person within a company. This information is derived from the job title, but cannot be achieved as a simple dictionary lookup, as it may involve external information, such as the particular company and the particular industry. These categories would enable one to determine persons who are at the VP level and above m a company, to determine the distribution of seniorities of individual contributors (ICs) in a company, and to determine to what companies an entry level person from a particular company usually transfers. As is known to those of skill in the art, there are normally two seniority tracks within a company—management and individual contributors.

The seniority level taxonomy is a categorical taxonomy that describes different levels of responsibilities in a company. It is simple and straightforward and has different categories for IC and management. For example, categories can include internship, entry level, experienced. IC, advanced IC, lower middle management, upper middle management, and executives.

A member's seniority score enables a comparison of the level of responsibilities of two members. For example, the CEO of a small start-up versus the CEO of a large multinational corporation. They both share the same seniority level within their company, that is CEO, but their "general seniority" is completely different. The seniority score therefore allows a comparison between an "associate professor at Stanford" and a "principal software engineer at a large Internet company" by using features like company size, education, industry, etc. For example, a CEO from an Internet company having more than 1,000 employees may be assigned a seniority score of 0.8, while a CEO of an Internet company with less than 20 employees may be assigned a value of 0.5. The values of 0.8 and 0.5 then permit the direct comparison of these two CEOs.

In an embodiment, a specialty field is a list of skills or domains that were explicitly mentioned in the job title. This list is used in the context of the position, and it is used to better disambiguate different roles. For example, there may be "java software engineer," "software developer-algorithms," or "machine learning engineer." in all of these three cases, the role was the same, as in this context, "software engineer," "software developer," and "engineer" represent the same role, but each one of those positions requires a. different set of skills, represented here by "java," "algorithms," and "machine learning." One could argue that "software" can also be a skill and "engineer" is the role. While this is true, the granularity of roles is defined by the taxonomy. If "software engineer" is part of the title taxonomy, then no attempt is made to break it into different dimensions. If it was decided to add "algorithms software engineer" to the title taxonomy, then there would be no attempt to break it up either. In this case, the title taxonomy is hierarchical and is known that "algorithms software engineer" is a "software engineer." If the specialty is missing, the inferred skills can still be used to understand the type of role. For example, if someone says "I am a software engineer", one still may want to determine what kind of software engineer that person is, based on the skill or skill cluster.

An accreditation list represents the level of the person's or job position's certification, when it is explicit in the title string. Some possible options may be "apprentice," "certified," etc.

An employment status list represents the employment relationship between this member and the company. Some possible options may be "contractor," "full time," etc.

Based on the foregoing, if a raw job title is "Senior VP of finance," the role would be "VP of finance," the explicit seniority would be "Senior," and the specialty, accreditation, and employment status would be "null." As another example, if the raw job title is "part time registered java developer," the role would be "software engineer," the title seniority would be "IC," the explicit seniority would be "null," the specialty would be "java," the accreditation would be "registered," and the employment status would be "part time."

Regarding the dimensional taxonomies, each dimension has its own taxonomy. In an embodiment, the more complex taxonomies (i.e., roles, skills, and domains) are hierarchical, with a vagueness level specified for each entry. When a taxonomy is hierarchical, then if an entity A is added that differs from an entity B by its domain, then one should be able to say that "A is a B". For example, the taxonomy may include the two following roles. "software engineer" and "engineer". When "java software engineer" is classified it would be mapped to a role of "software engineer" and a skill of "java." When "sanitation engineer," is classified, it would be mapped to a role of "engineer" and a specialty of "sanitation." Although in both cases the entire essence of the raw title was captured, clients should have the ability to understand that the role of "engineer" is more vague, w/o traversing the taxonomy.

In an embodiment, the roles taxonomy does not have different ids for synonyms. The taxonomy holds all synonym information and the classifier maps each of those to the same title id. The taxonomy also holds some of the external information for the more common positions, even if the complete position is not part of the roles taxonomy. For example, if "java developer" occurs frequently enough, but it is still not desired that it be added to the roles taxonomy, the taxonomy should taxonomize "java developer" into a role of "software engineer" and a skill of "java." This can be used for presentation purposes, such as a type-ahead feature. Each taxonomy can be language agnostic and each entity can represent, the same concepts in different languages.

As noted above, a raw title may describe a list of positions. There are a plurality of scoring options that can be considered. There can be any combinations of the following—score per field (i.e., how certain that the essence of the raw title was captured using the field selected from the role taxonomy), score per field (i.e., how certain that the essence of the specific position was captured using the field selected from the role taxonomy), score per position (i.e., how certain that the essence of the position as a whole was captured using the field selected from the taxonomy), and the score per raw title (i.e., how certain that the essence of all the positions for this raw title was captured using the field selected from the taxonomy).

Figure 4A:
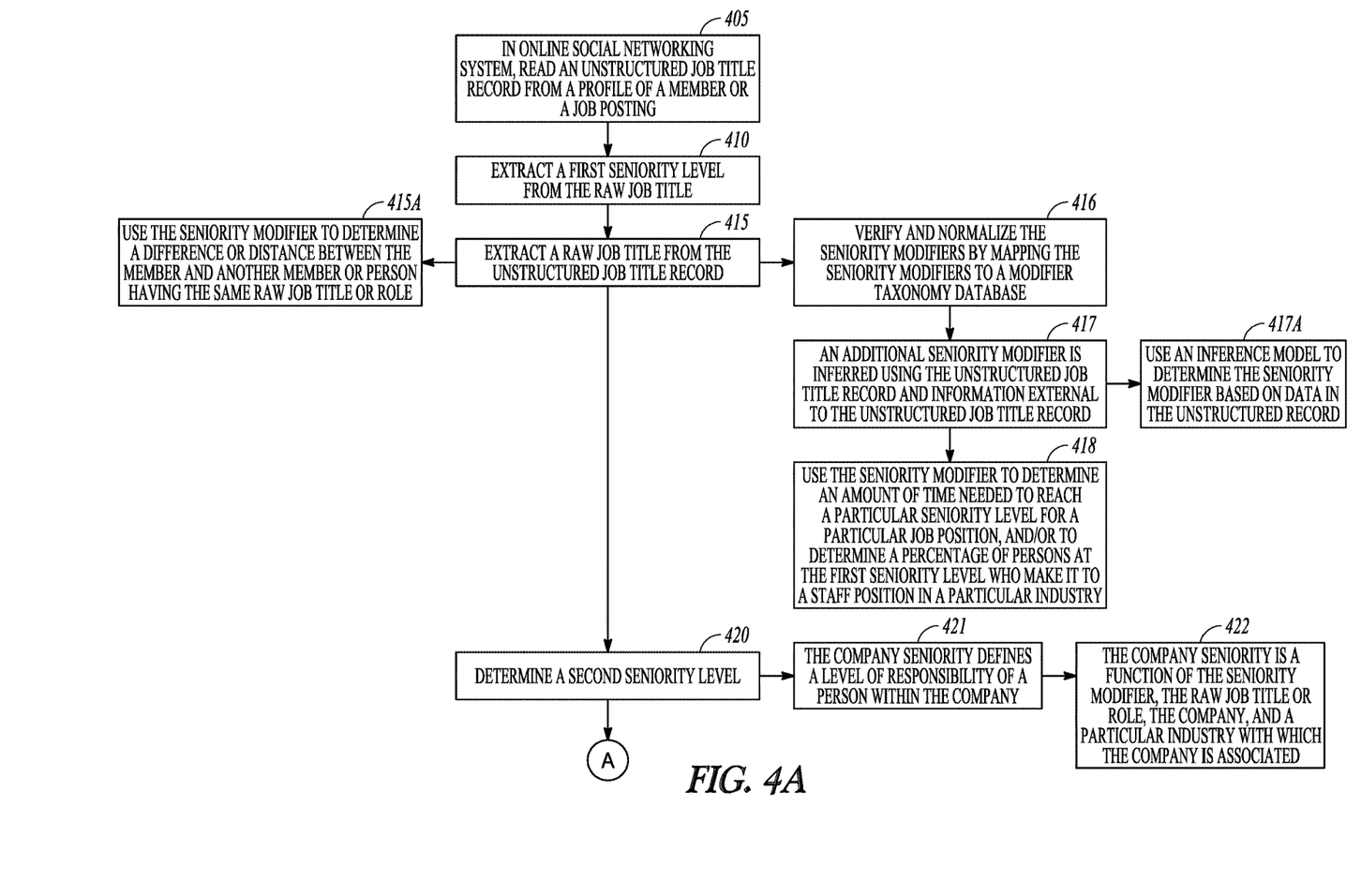
FIGS. 4A and 4B are a flow diagram of an example embodiment of a process to determine a multi-level seniority of a social network member or a position in a job posting on an online social networking system.
Figure 4B:
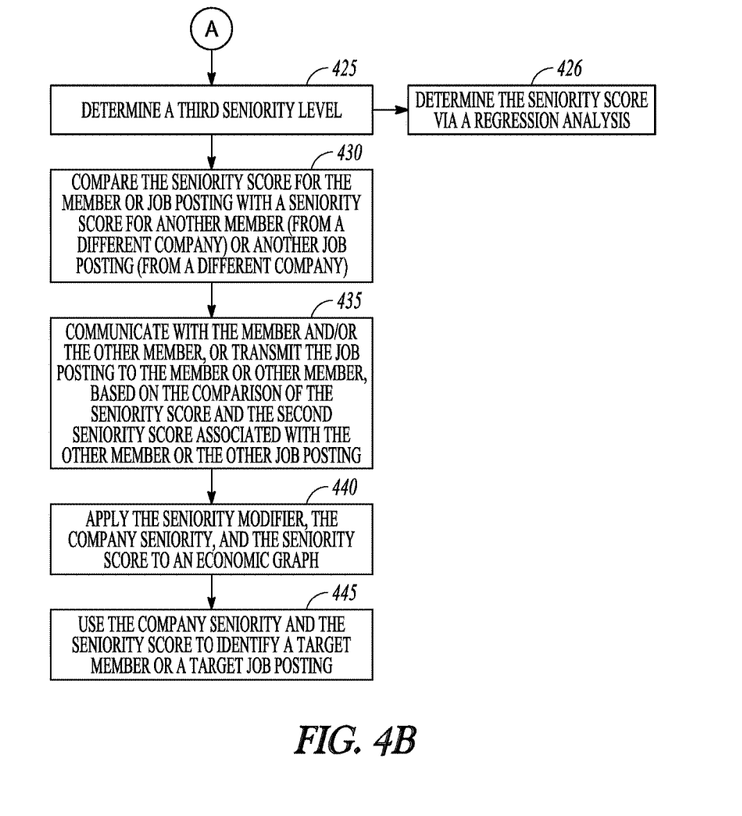

FIGS. 4A-4B are a flow diagram illustrating an example method of determining a multi-level seniority for a member of an online social networking system or a job posting on the online social networking system. In various embodiments, the method may be implemented by one or more of the modules of FIG. 2. FIGS. 4A-4B include a number of process blocks 405-445. Though arranged somewhat serially in the example of FIGS. 4A-4B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIGS. 4A and 4B, at 405, an online social networking system reads an unstructured job title record from a profile of a member or a job posting. As noted above, in an online social networking system, each member has a profile that includes professional, educational, and personal information about the member. An online social networking system can also include a database of available jobs that can be searched by the members. The unstructured job title record includes the title, position, or role of the job, and further descriptive details about the job.

At 410, the online social networking system extracts a raw job title from the unstructured job title record. The raw job title includes one or more job positions or roles. As noted above, in a member profile, the job role describes what a person does, and in a job posting, it describes what a person in such a job is expected to do. That is, the job position or role includes a responsibility of a person in a company. The company in the unstructured job title record is either the company that the member has worked for or is presently working for, or the identification of the company that is seeking to fill the open job position in the job posting. In an embodiment, terms in the unstructured job title record are extracted from the record, and then used to key into the role taxonomy to determine if such term or terms are a job role. Both exact match searching/comparisons and approximate/fuzzy searching/comparisons can be executed. Any matches, either exact or approximate, can then be identified as a job role in the unstructured job title record. For non-exact matches, as explained in further detail herein, a confidence level can be calculated that indicates the level of confidence that the approximate match identifies the actual job role from the unstructured job title record.

At 415, the online social networking system extracts a first seniority level from the raw job title. The first seniority level is a seniority modifier associated with the raw job title. For example, as noted above, a software engineer can be a senior software engineer. In this example, the term "senior" is the seniority modifier. In an embodiment, the online social networking system extracts the seniority modifier by first identifying the raw job title as described above, and then examining the first several words prior to and after the raw job title to determine if any modifiers are present. As indicated at 415A, the online social networking system uses the seniority modifier to determine a difference or distance between the member and another member or person having the same raw job title or role. For example, a senior data scientist is believed to have more knowledge and experience than an associate data scientist.

At 416, the online social networking system verifies and normalizes the seniority modifiers by mapping the seniority modifiers to a modifier taxonomy database. In an embodiment, the seniority modifier taxonomy database is created and maintained by identifying terms that commonly appear in members' profiles and in job postings, examining the most frequently appearing terms, and storing the ones that can be identified as seniority modifiers in the seniority modifier database taxonomy. If no seniority modifiers are found in the unstructured raw job title record, then the seniority modifier field in the member seniority database is set to null.

At 417, an additional seniority modifier can be inferred by the online social networking system using the unstructured job title record and information external to the unstructured job title record. For example, a member profile or a job posting may not have or use the seniority modifier "senior" in connection with a particular job role. However, there may be an indication that the member has so many years of experience or that a particular job posting requires so many years of experience from its job applicants. The online social networking system can then check external resources to determine if there is any particular seniority modifier associated with that many years of experience in that particular job, or company, or industry.

At 417A, the online social networking system uses an inference model to determine the seniority modifier based on data in the unstructured record. For example, a prediction module can be configured to access data associated with members having particular seniority modifiers, and then to classify the data as signature data. Moreover, the prediction module can be configured to perform prediction modeling based on the signature data and a prediction model (e.g., a logistic regression model), in order to identify seniority modifiers in the unstructured record that are associated with data matching the signature data. Accordingly, the prediction module may identify seniority modifiers in an unstructured record.

At 418, the online social networking system uses the seniority modifier to determine an amount of time needed to reach a particular seniority level for a particular job position, and/or to determine a percentage of persons at the first seniority level who make it to a staff position in a particular industry. For example, the online social networking system can identify all members or software engineers who are at a senior level, determine from the profiles of these members the amount of time that they have been employed as a software engineer, and then calculate an average amount of time from all of the members. In an even more intelligent system, the online social networking system can periodically check a member's profile and determine when the seniority modifier first appeared in the member profile, calculate the amount of time that it took the member to attain that seniority status, and then determine an average for all such members who have recently become a senior software engineer.

At 420, the online social networking system determines a second seniority level. The second seniority level is a company seniority within the company that is associated with the unstructured job title record. For example, a particular company may not use the term "senior software engineer," but rather may use the term "advanced" or "executive software engineer." In an embodiment, the second or company seniority level can be determined by searching the website of the company, for example via a "Come work for us" button or link, a company publication, or other industry trade publications or websites.

As indicated at 421, the company seniority defines a level of responsibility of a person within the company. As further indicated at 422, the company seniority is a function of the seniority modifier, the raw job title or role, the company, and a particular industry with which the company is associated. In most instances however, all of these factors are taken into account in selecting the company seniority before putting the company seniority in the member profile or the job posting, and the company seniority can then be used as is in the online social networking system. For example, such a use can be like that as indicated at 422, wherein the online social networking system uses the company seniority to determine the persons who are at the company seniority level in the company, a seniority distribution in the company, and an identification of another company to which persons from a particular company seniority level in the company tend to transfer.

At 425, the online social networking system determines a third seniority level. The third seniority level is a seniority score for the member or the job posting. The seniority score permits a comparison between members who are employed at different companies or between job postings of different companies.

At 426, the online social networking system determines the seniority score via a regression analysis. The regression analysis uses values associated with one or more of the job title or role, the seniority modifier, the company seniority, a number of years of experience of the member, an industry associated with the company, a size of the company, and a set of skills associated with the member. More specifically, in different embodiments, the regression analysis can be a linear regression analysis or a regression analysis of higher order. As is known to those of skill in the art, linear regression is a subset of regression analysis that only allows linear terms. In such a regression analysis, there is a truth data point and other data points. The truth data point is treated as a dependent variable that depends on the other data points. Data are collected for all the data points (job title, seniority modifier, company seniority, years of experience of the member, industry associated with the company, size of the company, and skills associated with the member), and the collected data as matched data sets are put into a regression analysis program, such as a Matlab regression analysis. The regression analysis generates coefficients $\alpha$, $\beta$, $\gamma$, $\delta$, $\varepsilon$, $\zeta$, and $\eta$ that best match the data for a function such as:

$$\text{Seniority Score}=\alpha(JT)+\beta(SM)+\gamma(CS)+\delta(YE)+\varepsilon(CI)+\zeta(SC)+\eta(MS)$$

wherein JT represents the job title, SM represents the seniority modifier, CS represents the company seniority, YE represents the years of experience of the member, CI represents the company's industry, SC represents the size of the company, and MS represents the member's skills. The regression analysis also generates a magnitude of the error for the collected data. This regression analysis is performed over many different data sets. Once determined, the coefficients can provide an accurate seniority score.

At 430, the online social networking system compares the seniority score for the member or job posting with a seniority score for another member (from a different company) or another job posting (from a different company). As noted, the seniority score permits comparisons between employees from different companies and job postings from different companies.

At 435, the online social networking system communicates with the member and/or the other member, or the system transmits the job posting to the member or other member, based on the comparison of the seniority score and the second seniority score associated with the other member or the other job posting. For example, the online social networking system could suggest a connection between two members based on the two members having very similar seniority scores for the same job role. As another example, the online social networking system could suggest a particular job posting to a member because the member's job role matches the job role of the job posting, and the member's seniority score and the seniority score of the job posting are similar.

At 440, the online social networking system applies the seniority modifier, the company seniority, and the seniority score to an economic graph. As noted above, an economic graph is a feature of an online social networking system that digitally maps the global economy to connect talent with opportunity on a massive scale.

At 445, the online social networking system uses the company seniority and the seniority score to identify a target member or a target job posting. For example, the online social networking system may suggest that the member connect with another member because the members share the same or very similar seniority levels and values. As another example, the online social networking system may recommend a particular job to a member because the member's seniority levels match up with the seniority levels in the job posting.

Figure 5:
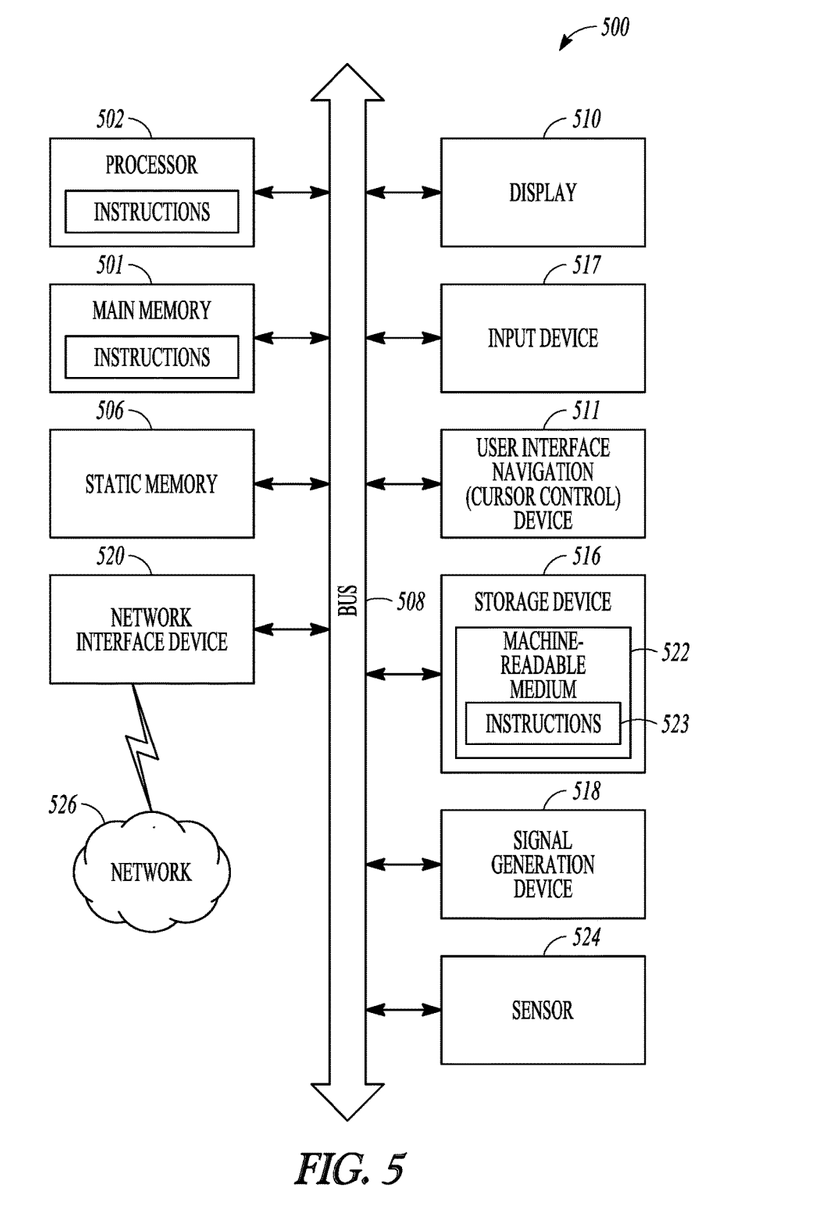
FIG. 5 is a block diagram of a machine in the form of a computing device within which a set of instructions, for causing the machine to perform any one or more of the methodologies discussed herein, may be executed.

FIG. 5 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. in a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 501 and a static memory 506, which communicate with each other via a bus 508. The computer system 500 may further include a display unit 510, an alphanumeric input device 517 (e.g., a keyboard), and a user interface (UI) navigation device 511 (e.g., a mouse). In one embodiment, the display, input device and cursor control device are a touch screen display. The computer system 500 may additionally include a storage device 516 (e.g., drive unit), a signal generation device 518 (e.g., a speaker), a network interface device 520, and one or more sensors 521, such as a global positioning system sensor, compass, accelerometer, or other sensor.

The drive unit 516 includes a machine-readable medium 522 on which is stored one or more sets of instructions and data structures (e.g., software 523) embodying or utilized by any one or more of the methodologies or functions described herein. The software 523 may also reside, completely or at least partially, within the main memory 501 and/or within the processor 502 during execution thereof by the computer system 500, the main memory 501 and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 523 may further be transmitted or received over a communications network 526 using a transmission medium via the network interface device 520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A social networking system comprising:
one or more processors; and
a computer readable medium storing instructions that, when executed by the one or more processors, cause the system to perform operations comprising:
receiving an unstructured job title record from a profile of a member or a job posting;
extracting a raw job title from the unstructured job title record, the raw job title comprising one or more job positions or roles, wherein a job position or role comprises a responsibility of a person in a company, and wherein the company is associated with the unstructured job title record, wherein extracting the raw job title from the unstructured job title record comprises finding all title entities in a title taxonomy that were mentioned in the raw job title from the unstructured job title record;
extracting a first seniority level from the raw job title, the first seniority level comprising a seniority modifier associated with the raw job title;
determining a second seniority level, the second seniority level comprising a company seniority within the company associated with the unstructured job title record;
determining a third seniority level, the third seniority level comprising a seniority score for the member or the job posting;
comparing the seniority score with a second seniority score that is associated with a second member or a second job posting, wherein the second member and the second job posting are associated with a second company;
communicating with the member or the second member, or transmitting the job posting to the member or second member, based on the comparison of the seniority score and the second seniority score associated with the second member or the second job posting; and
using the seniority modifier to determine one or more of an amount of time needed to reach a particular seniority level for a particular job position, and a percentage of persons at the first seniority level who make it to a particular position in a particular industry.

2. The system of claim 1, comprising normalizing a plurality of seniority modifiers by mapping the seniority modifiers to a modifier taxonomy.

3. The system of claim 1, comprising inferring an additional seniority modifier using the unstructured job title record and information external to the unstructured job title record.

4. The system of claim 1, comprising using an inference model to determine the seniority modifier based on data in the unstructured record.

5. The system of claim 1, wherein the seniority modifier functions to determine a difference or distance between the member and another person having the same raw job title or role.

6. The system of claim 1, wherein the company seniority defines a level of responsibility of a person within the company, and wherein the company seniority is a function of the seniority modifier, the raw job title or role, the company, and a particular industry with which the company is associated.

7. The system of claim 6, comprising using the company seniority to determine persons who are at the company seniority level in the company, a seniority distribution in the company, and an identification of another company to which persons from a particular seniority level in the company tend to transfer.

8. The system of claim 1, wherein the determining the seniority score comprises determining the seniority score via a regression analysis, wherein the regression analysis uses one or more of the job title or role, the seniority modifier, the company seniority, a number of years of experience of the member, an industry associated with the company, a size of the company, and a set of skills associated with the member.

9. The system of claim 1, comprising applying the seniority modifier, the company seniority, and the seniority score to an economic graph.

10. The system of claim 1, comprising using the company seniority and the seniority score to identify a target member or a target job posting.

11. A process comprising:
   receiving, via a computer processor, an unstructured job title record from a profile of a member of an online social networking system or a job posting on the social networking system;
   extracting, via the computer processor, a raw job title from the unstructured job title record, the raw job title comprising one or more job positions or roles, wherein a job position or role comprises a responsibility of a person in a company, and wherein the company is associated with the unstructured job title record, wherein extracting the raw job title from the unstructured job title record comprises finding all title entities in a title taxonomy that were mentioned in the raw job title from the unstructured job title record;
   extracting, via the computer processor, a first seniority level from the raw job title, the first seniority level comprising a seniority modifier associated with the raw job title;
   determining, via the computer processor, a second seniority level, the second seniority level comprising a company seniority within the company associated with the unstructured job title record;
   determining, via the computer processor, a third seniority level, the third seniority level comprising a seniority score for the member or the job posting;
   comparing, via the computer processor, the seniority score with a second seniority score that is associated with a second member or a second job posting, wherein the second member and the second job posting are associated with a second company;
   communicating, via the computer processor, with the member or the second member, or transmitting the job posting to the member or second member, based on the comparison of the seniority score and the second seniority score associated with the second member or the second job posting;
   using, via the computer processor, the seniority modifier to determine one or more of an amount of time needed to reach a particular seniority level for a particular job position, and a percentage of persons at the first seniority level who make it to a particular position in a particular industry.

12. The process of claim 11, comprising normalizing a plurality of seniority modifiers by mapping the seniority modifiers to a modifier taxonomy.

13. The process of claim 11, comprising inferring an additional seniority modifier using the unstructured job title record and information external to the unstructured job title record.

14. The process of claim 11, comprising using an inference model to determine the seniority modifier based on data in the unstructured record.

15. The process of claim 11, wherein the seniority modifier functions to determine a difference or distance between the member and another person having the same raw job title or role.

16. The process of claim 11, wherein the company seniority defines a level of responsibility of a person within the company, and wherein the company seniority is a function of the seniority modifier, the raw job title or role, the company, and a particular industry with which the company is associated; and comprising using the company seniority to determine persons who are at the company seniority level in the company, a seniority distribution in the company, and an identification of another company to which persons from a particular seniority level in the company tend to transfer.

17. The process of claim 11, wherein the determining the seniority score comprises determining the seniority score via a regression analysis, wherein the regression analysis uses one or more of the job title or role, the seniority modifier, the company seniority, a number of years of experience of the member, an industry associated with the company, a size of the company, and a set of skills associated with the member.

18. A non-transitory computer readable medium comprising instructions that when executed by a processor execute a process comprising:
   receiving an unstructured job title record from a profile of a member of an online social networking system or a job posting on the social networking system;
   extracting a raw job title from the unstructured job title record, the raw job title comprising one or more job positions or roles, wherein a job position or role comprises a responsibility of a person in a company, and wherein the company is associated with the unstructured job title record, wherein extracting the raw job title from the unstructured job title record comprises finding all title entities in a title taxonomy that were mentioned in the raw job title from the unstructured job title record;
   extracting a first seniority level from the raw job title, the first seniority level comprising a seniority modifier associated with the raw job title;
   determining a second seniority level, the second seniority level comprising a company seniority within the company associated with the unstructured job title record;
   determining a third seniority level, the third seniority level comprising a seniority score for the member or the job posting;
   comparing the seniority score with a second seniority score that is associated with a second member or a second job posting, wherein the second member and the second job posting are associated with a second company;
   communicating with the member or the second member, or transmitting the job posting to the member or second member, based on the comparison of the seniority score and the second seniority score associated with the second member or the second job posting;
   using the seniority modifier to determine one or more of an amount of time needed to reach a particular seniority level for a particular job position, and a percentage of persons at the first seniority level who make it to a particular position in a particular industry.

* * * * *